United States Patent [19]
Lin

[11] Patent Number: 5,300,173
[45] Date of Patent: Apr. 5, 1994

[54] METHOD FOR PRINTING SOFT RESIN

[76] Inventor: Jenq Y. Lin, No. 1, Lane 35, Feng Ren Road, Feng Shan City, Kaoh Shng County, Taiwan

[21] Appl. No.: 43,548

[22] Filed: Apr. 6, 1993

[51] Int. Cl.⁵ .................. B32B 31/00; B41F 15/04
[52] U.S. Cl. .................... 156/277; 156/90; 101/115; 101/129
[58] Field of Search ............ 101/115, 129; 156/90, 156/277, 289, 63

[56] References Cited

U.S. PATENT DOCUMENTS

| | | | |
|---|---|---|---|
| 3,460,471 | 8/1969 | Green et al. | 101/115 |
| 4,038,123 | 7/1977 | Sammis | 156/277 |
| 4,119,745 | 10/1978 | Smith | 156/90 |
| 4,424,089 | 1/1984 | Sullivan | 101/129 |
| 4,830,695 | 5/1989 | Shlemon | 101/129 |
| 4,903,592 | 2/1990 | Ericsson | 101/115 |

Primary Examiner—David A. Simmons
Assistant Examiner—Chester T. Barry
Attorney, Agent, or Firm—Morton J. Rosenberg; David I. Klein

[57] ABSTRACT

A method for printing soft resin in which a composite printing material containing PVC-pasteresin, plasticizer, epoxy oil, titan dioxide BC complex, stabilizer, Hi-Sil 244, pigment, etc. is employed. The gelation temperature of such composite printing material is reduced to be within 150°-160° C. The composite printing material of different colors are sequentially applied to separate matrixes in several times depending on number of colors to be printed. Article to be printed with a desired pattern is positioned beneath the matrixes. Each time the printing material is applied, it is dried and then cooled so that it forms color fast and lasting pattern on the article.

1 Claim, 5 Drawing Sheets

METHOD FOR PRINTING SOFT RESIN

BACKGROUND OF THE INVENTION

The present invention mainly relates to a printing method which provides colored, bright, and three-dimensional patterns.

There are a lot of garments, socks, T-shirts, and towels designed with various kinds of pattern, texts, etc. Such patterns or texts are usually shown by printed ink, patched pieces of printed cloth, or printed adhesive films which are sealed to articles after the procedures of gluing and electric static treatment. However, patterns formed from the above-mentioned methods are usually subject to faded color due to washing, blur due to shedding, and accordingly, less value due to spoiled appearance.

Therefore, it is desirable to have a printing method to provide color fast and lasting patterns while the patterns so printed are brighter, sharper, and give a three-dimensional effect.

SUMMARY OF THE INVENTION

A primary object of the present invention is to provide a method for printing soft resin in which a composite printing material is employed to print on articles with the aid of matrixes. The composite printing material is then dried and gelled at a temperature in the range from 150° to 160° C. After the printing material becomes cooled, a solid, embossed, lasting, color fast pattern may be formed.

DETAILED DESCRIPTION OF THE PREFERRED EMBODIMENTS

Figure 8:
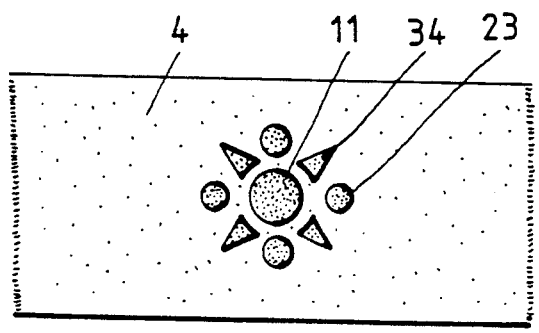
FIG. 8 shows a finished product completed with the printing method according to the present invention.

Please refer to FIG. 8 in which an article 4, that can be a piece of garment, sock, or cloth, etc., has a pattern that includes three different colors and is printed with printing material 11, 23, 34 and printing method according to the present invention. All the three colored printing material 11, 23, 34 give an embossing effect.

The printing material used in the present invention to form the embossed pattern is mainly composed of:

| | |
|---|---|
| 1. PVC-paste resin | about 20% by weight |
| 2. PVAC-paste resin | about 25% by weight |
| 3. Plasticizer | about 30% by weight |
| 4. Epoxy oil | about 5% by weight |
| 5. Titan Dioxide BC Complex | about 5% by weight |
| 6. Stabilizer | about 5% by weight |
| 7. Hi-Sil 244 | about 10% by weight |
| 8. Pigment, depending on the shades of colors. | |

Printing material having the above listed compositions shall not only provide embossed patterns, but also have a reduced gelation temperature of 150°–160° C. that would protect the articles 4 to be printed from being damaged during the process of drying printing material printed on the articles 4.

Figure 1:
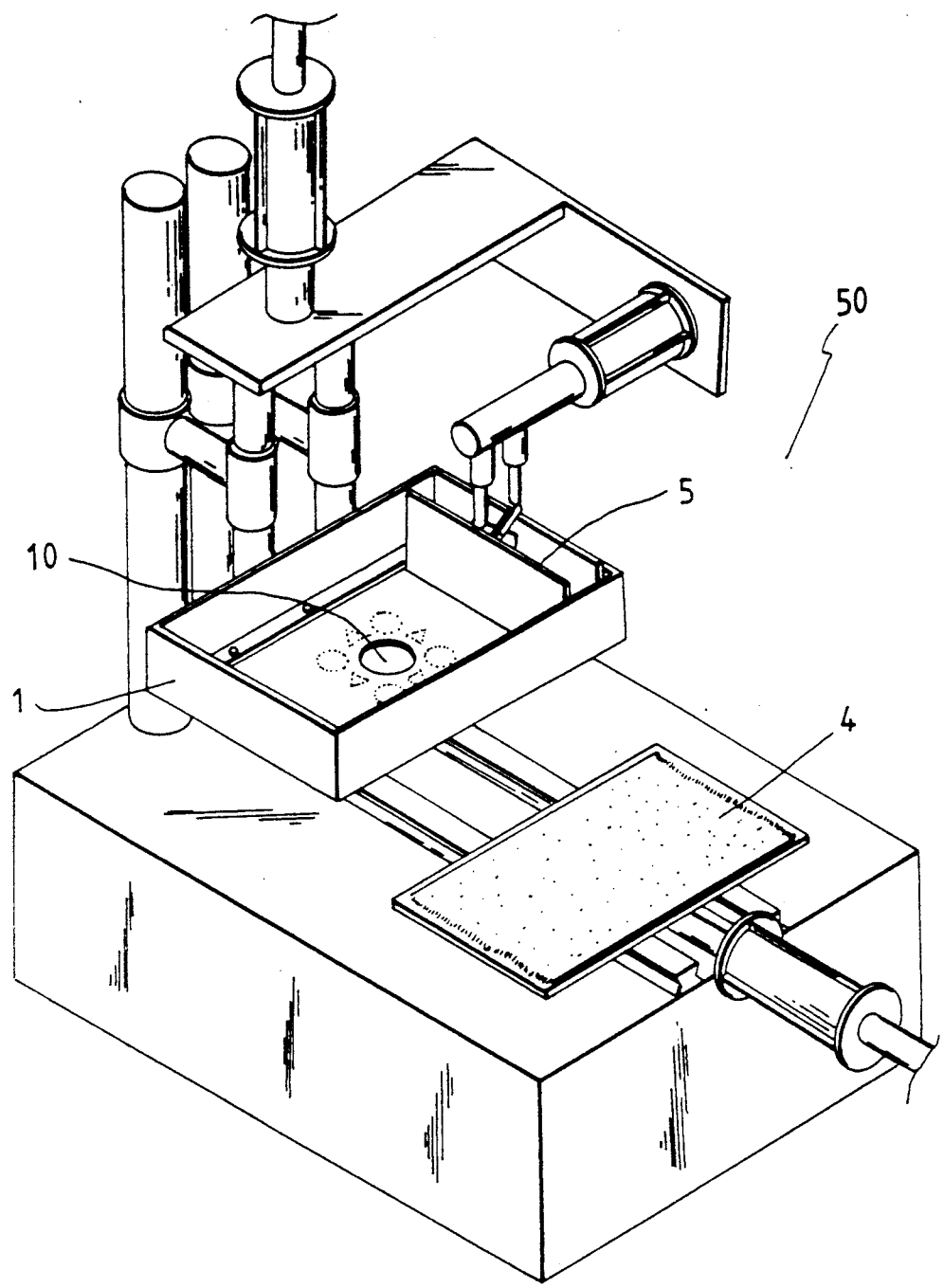
FIG. 1 is a three-dimensional perspective of a press used to carry out the printing according to the present invention.

Please now refer to FIG. 1, a press 50 is used to carry out the printing according to the present invention. Matrices in the number the same as that of colors contained in a pattern to be printed with the press 50 are prepared in advance for use at different stages of printing.

Figure 2:
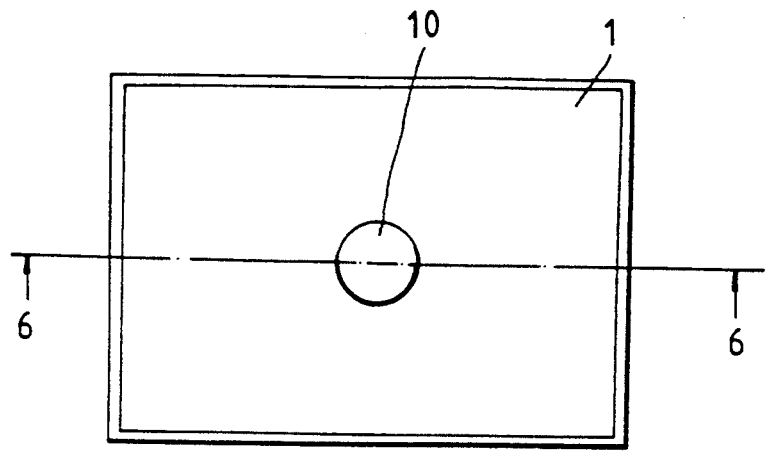
FIG. 2 illustrates the printing of the first colored printing material according to the present invention.
Figure 3:
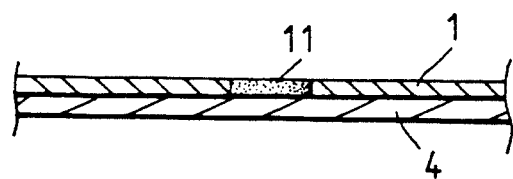
FIG. 3 is a sectional view taken along line 6—6 of FIG. 2.

At the first stage of printing, a No.1 matrix 1 having a removed portion 10 is used to print a first color on an desired article 4. Apply the printing material 11 in the first color to the article 4 by putting the printing material 11 into the portion 10 of the No.1 matrix 1 and scraping the same back and forth with a scraping means 5 so that the printing material 11 is evenly transferred to the article 4 beneath the No.1 matrix 1. When the printing of the first printing material 11 is completed, electrically heat and dry the printing material at 150°–160° C. for 3–5 minutes. The dried printing material 11 is then cooled with a fan for 2–3 minutes, as shown in FIGS. 2 and 3.

Figure 4:
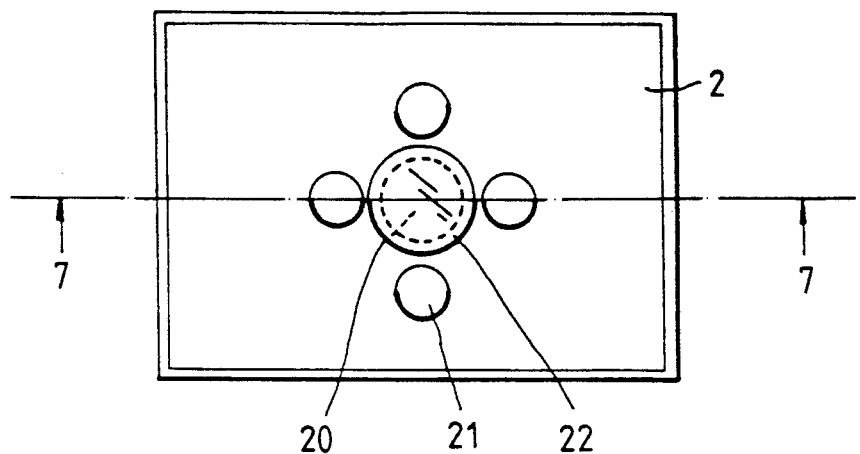
FIG. 4 illustrates the printing of the second colored printing material according to the present invention.
Figure 5:
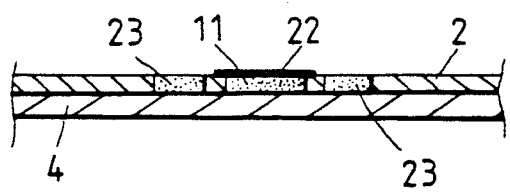
FIG. 5 is a sectional view taken along line 7—7 of FIG. 4.

At the second stage of printing, a No.2 matrix 2 having removed portions 20, 21 is used to print a second color on the same article 4. The portion 20 has the same configuration and position as that of the portion 10 of the No.1 matrix 1 and the portion 21 corresponds to positions at where the second color is to be printed. Use a sheet of aluminium foil 22 to cover only the portion 20 from a top of the No.2 matrix 2. Put the printed article 4 beneath the No.2 matrix 2 such that the partially embossed pattern formed from the first printing material 11 during the first stage of printing is fitly positioned within the removed portion 20 of the No.2 matrix 2 and beneath the aluminium foil 22 without being crushed by the No.2 matrix 2. Apply the printing material 23 in the second color to the portion 21 of the No.2 matrix 2 without overlaying the portion 20, as shown in FIGS. 4, 5. Again, dry the printing material 23 at 150°–160° C. and air cool the same when it is dried.

Figure 6:
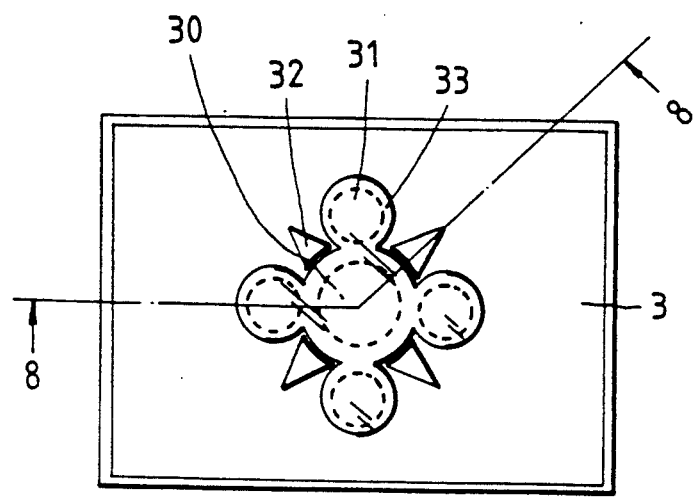
FIG. 6 illustrates the printing of the third colored printing material according to the present invention.
Figure 7:
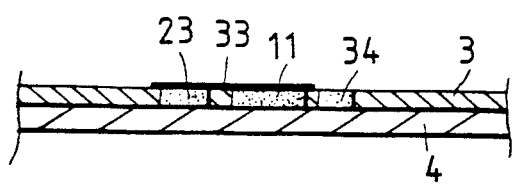
FIG. 7 is a sectional view taken along line 8—8 of FIG. 6.

At the third stage of printing, a No.3 matrix 3 having removed portions 30, 31, 32 is used to print a third color on the same article 4. The portion 30 has the same configuration and position as that of the portion 10 of the No.1 matrix 1 and the portion 20 of the No.2 matrix 2. The portion 31 has the same configuration and position as that of the portion 21 of the No.2 matrix 2. The portion 32 corresponds to the configuration and position at where the third color is to be printed on the article 4. Use a sheet of aluminium foil 33 to cover the portions 30, 31 from a top of the No.3 matrix 3. Repeat the same procedures as in the second stage to position the printed article 4 and apply the printing material 34 on the article 4. The printing material 34 is then electrically dried and air cooled to show colored pattern, as shown in FIGS. 6, 7, and 8.

What is claimed is:

1. A method for printing soft resin onto an article, comprising:

preparing a composite printing material of said soft resin containing the following compositions:

| | |
|---|---|
| PVC-paste resin | about 20% by weight |
| PVAC-paste resin | about 25% by weight |
| Plasticizer | about 30% by weight |
| Epoxy oil | about 5% by weight |
| Titan Dioxide BC Complex | about 5% by weight |
| Stabilizer | about 5% by weight |
| Hi-Sil 244 | about 10% by weight |
| Pigment, depending on shades of colors to be printed; | | making matrices in the same number as that of colors contained in a pattern to be printed with a press for use at different stages of printing;

using a first of said matrices that has a removed first portion corresponding to a first color of a desired pattern to be printed on said article, applying a first printing material in said first color to said article through said first portion of said first matrix beneath which said article is positioned; electrically heating and drying said first printing material which is now printed on said article at 150°-160° C. for 3-5 minutes; and cooling said printing material on said article with a fan for 2-3 minutes;

using a second of said matrices that has a removed second portion having a configuration and position corresponding to said first portion of said first matrix, and a removed third portion corresponding to a second color of said pattern;

using a first sheet of aluminium foil to cover said second portion from a top of said second matrix; putting said article having been printed with said first printing material beneath said second matrix such that a partially printed pattern formed from said first printing material is fitly positioned within said removed second portion of said second matrix and beneath said first sheet of aluminium foil without being crushed by said second matrix; applying a second printing material in said second color to said second matrix without overlaying said second portion; electrically drying said second printing material which is now printed on said article at 150°-160° C. for 3-5 minutes and air cooling said second printing material for 2-3 minutes; and using a third of said matrices that has a removed fourth portion having a configuration and position corresponding to said first portion of said first matrix and to said second portion of said second matrix, a removed fifth portion having a configuration and position corresponding to said third portion of said second matrix, and a removed six portion corresponding to a third color on said pattern; using a second sheet of aluminium foil to cover said fourth and said fifth portions from a top of said third matrix; putting said article having been printed with said first and said second printing material beneath said third matrix such that a partially printed pattern formed from said first and said second printing material is fitly positioned within said removed fourth and fifth portions of said third matrix and beneath said second sheet of aluminium foil without being crushed by said third matrix; applying a third printing material in said third color to said sixth portion of said third matrix without overlaying said fourth and said fifth portions; electrically drying and then air cooling said third printing material which is now printed on said article.

* * * * *